(12) United States Patent
Radulov et al.

(10) Patent No.: US 8,564,330 B1
(45) Date of Patent: Oct. 22, 2013

(54) METHODS AND SYSTEMS FOR HIGH FREQUENCY CLOCK DISTRIBUTION

(75) Inventors: Georgi I. Radulov, Eindhoven (NL); Patrick J. Quinn, Dublin (IE)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/488,915

(22) Filed: Jun. 5, 2012

(51) Int. Cl.
*H03K 19/00* (2006.01)
*G06F 1/04* (2006.01)

(52) U.S. Cl.
USPC ............ 326/93; 326/96; 327/41; 713/500; 713/501

(58) Field of Classification Search
USPC .............................................. 326/93; 327/41
See application file for complete search history.

(56) References Cited

U.S. PATENT DOCUMENTS

| | | | | |
|---|---|---|---|---|
| 5,559,459 A * | 9/1996 | Back et al. | | 326/93 |
| 6,640,310 B2 * | 10/2003 | Jensen et al. | | 713/500 |
| 7,398,406 B2 * | 7/2008 | Naruse et al. | | 713/322 |
| 7,545,188 B1 * | 6/2009 | Xu et al. | | 327/157 |
| 7,599,457 B2 * | 10/2009 | Johnson et al. | | 375/359 |
| 7,644,296 B1 * | 1/2010 | Burney | | 713/401 |
| 7,945,803 B2 * | 5/2011 | Jones et al. | | 713/501 |
| 7,956,665 B2 * | 6/2011 | Kehrer et al. | | 327/295 |

OTHER PUBLICATIONS

Stephens, Ransom, The Future of Multi-Clock Systems, © NEL Frequency Controls, 2007.*
Bechthum, Elbert et al., "Timing error measurement for highly linear wideband Digital to Analog Converters", *Proc. of the 2011 IEEE International Symposium on Circuits and Systems*, May 15, 2011. pp. 2019-2022, IEEE, Piscataway, New Jersey, USA.
Tang, Yongjian et al., "A 14b 200MS/s DAC with SFDR>78dBc, IM3<83dBc and NSD<-163dBm/Hz across the whole Nyquist Band enabled by Dynamic-Mismatch Mapping," *Proc. of the 2010 IEEE Symposium on VLSI Circuits*, Jun. 16, 2010, pp. 151-152, IEEE, Piscataway, New Jersey, USA.

* cited by examiner

*Primary Examiner* — Shawki Ismail
*Assistant Examiner* — Nelson Correa
(74) *Attorney, Agent, or Firm* — Gerald Chan (57) ABSTRACT

In accordance with some embodiments, a method for high frequency clock distribution in a VLSI system includes splitting an original master clock signal into one or more pairs of lower-frequency sub-clocks for a destination in the VLSI system, distributing each lower-frequency sub-clock of the one or more pairs of lower-frequency sub-clocks to a corresponding channel coupled to the destination, and reconstructing a reference master clock signal at the destination from the one or more pairs of lower-frequency sub-clocks, wherein the reconstructed reference master clock signal replicates the original master clock signal.

20 Claims, 10 Drawing Sheets

METHODS AND SYSTEMS FOR HIGH FREQUENCY CLOCK DISTRIBUTION

FIELD OF THE APPLICATION

This application relates generally to high frequency clock distribution in a very-large-scale integration (VLSI) system, and in particular to methods and systems for high frequency clock distribution.

BACKGROUND

Timing references (e.g., clock signals) are often transmitted between components in a very-large-scale integration (VLSI) system. Distribution of a master clock signal (i.e., timing reference) in a VLSI system is typically achieved using a single distribution channel coupled between a transmitter and a receiver. As the channel length grows the magnitude of parasitic resistances and capacitances associated with the channel also grows. Such parasitic resistances and capacitances associated with the channel effectively act as a low-pass filter to the master clock signal being transmitted from the transmitter to the receiver. Thus, as the frequency of master clock signals increase so too does the power attenuation that occurs during transmission of the master clock signals across the channel.

At the receiver side, the received master clock signal must meet a minimum power threshold in order to be reconstructed. One approach for maintaining a power level sufficient to meet the minimum power threshold is to drive the master clock signal at a higher power. However, at higher frequencies, power attenuation is significantly more prominent and as such simply increasing the driving power (at such high frequencies) may not be sufficient to meet the minimum power threshold. Moreover, there is a desire to limit the driving power of the master clock signal in order to optimize performance of VLSI systems.

SUMMARY

In accordance with some embodiments, a method for high frequency clock distribution in a VLSI system includes splitting an original master clock signal into one or more pairs of lower-frequency sub-clocks for a destination in the VLSI system, distributing each lower-frequency sub-clock of the one or more pairs of lower-frequency sub-clocks to a corresponding channel coupled to the destination, and reconstructing a reference master clock signal at the destination from the one or more pairs of lower-frequency sub-clocks, wherein the reconstructed reference master clock signal replicates the original master clock signal.

In one or more embodiments, the act of reconstructing the reference master clock signal comprises performing error correction.

In one or more embodiments, the act of splitting the original master clock signal is performed using a ring-shift register.

In one or more embodiments, the act of splitting the original master clock signal is performed using a frequency divider and a shift register.

In one or more embodiments, the act of splitting the original master clock signal into one or more pairs of lower-frequency sub-clocks is performed based at least in part upon a fundamental frequency of the original master clock signal.

In one or more embodiments, the act of splitting the original master clock signal into one or more pairs of lower-frequency sub-clocks is performed based at least in part upon attenuation characteristics of the channels coupled to the destination.

In one or more embodiments, the one or more pairs of lower-frequency sub-clocks are duty cycle mismatched.

In one or more embodiments, the one or more pairs of lower-frequency sub-clocks are phase mismatched.

In one or more embodiments, each lower-frequency sub-clock of the one or more pairs of lower-frequency sub-clocks represents a different phase.

In accordance with other embodiments, a method for reconstructing a reference master clock signal that replicates an original master clock signal from a pair of lower-frequency sub-clocks that suffers from timing errors includes generating a pair of intermediate signals from the pair of lower-frequency sub-clocks that suffer from timing errors, reconstructing a first reference master clock signal from the pair of lower-frequency sub-clocks that suffer from timing errors, determining whether the first reference master clock signal replicates the original master clock signal, performing time-calibration on the intermediate signals to generate time-calibrated intermediate signals when the first reference master clock signal fails to replicate the original master clock signal, and reconstructing a second reference master clock signal by combining the time-calibrated intermediate signals, wherein the second reference master clock signal replicates the original master clock signal.

In one or more embodiments, the time-calibration is performed iteratively.

In one or more embodiments, the pair of lower-frequency sub-clocks that suffers from timing errors is duty-cycle mismatched.

In one or more embodiments, the pair of lower-frequency sub-clocks that suffers from timing errors is phase-mismatched.

In one or more embodiments, the act of determining whether the first reference master clock signal replicates the original master clock signal includes creating a duty cycle signal using either rising edges or falling edges of the first reconstructed reference master clock signal, and comparing the duty cycle signal to a reference duty cycle.

In accordance with other embodiments, an apparatus for performing high frequency clock distribution in a VLSI system includes a ring-shift register configured to split an original master clock signal into a pair of lower-frequency sub-clocks, a pair of channels coupled to the ring-shift register, each channel of the pair of channels corresponding to a lower-frequency sub-clock of the pair of lower-frequency sub-clocks, a pair of AND gates, each AND gate of the pair of AND gates coupled to the pair of lower-frequency sub-clocks, wherein the pair of AND gates are configured to generate a pair of intermediate signals, a pair of delay components, each delay component of the pair of delay components coupled to a corresponding intermediate signal in the pair of intermediate signals, wherein the pair of delay components is configured to perform time-calibration on the pair of intermediate signals to generate a pair of time-calibrated intermediate signals, and an OR gate coupled to the pair of time-calibrated intermediate signals, the OR gate configured to reconstruct a reference master clock signal that replicates the original master clock signal.

In one or more embodiments, the pair of delay components is configured to perform time-calibration on the pair of intermediate signals in an iterative manner.

In one or more embodiments, the pair of lower-frequency sub-clocks is duty-cycle mismatched.

In one or more embodiments, the pair of lower-frequency sub-clocks is phase mismatched.

In one or more embodiments, the pair of delay components is configured to perform the time-calibration on the pair of intermediate signals by performing the time-calibration on one intermediate signal of the pair of intermediate signals.

In one or more embodiments, the pair of delay components is configured to perform the time-calibration on the pair of intermediate signals by performing the time-calibration on both intermediate signals of the pair of intermediate signals.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only exemplary embodiments and are not therefore to be considered limiting of the scope of the claims.

FIG. 5-1 illustrates a ring-shift register for generating sub-clocks according to some embodiments.

FIG. 5-2 illustrates a splitter that includes a frequency divider and a shift register for generating sub-clocks according to some embodiments.

FIG. 6-1 illustrates a master clock signal split into a single pair of lower-frequency sub-clocks without duty cycle mismatch and its subsequent reconstruction.

FIG. 6-2 illustrates a master clock signal split into a single pair of lower-frequency sub-clocks with duty cycle mismatch and its subsequent reconstruction.

FIGS. 9-1 and 9-2 illustrate an example of the reconstruction of the original master clock signal using the receiver-side component of FIG. 8.

DETAILED DESCRIPTION

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated, or if not so explicitly described. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Figure 1:
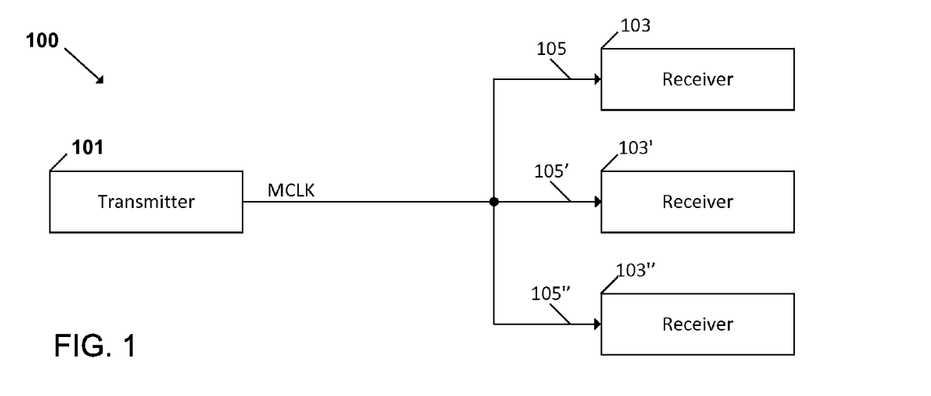
FIG. 1 illustrates a VLSI system for clock distribution.

Timing references (e.g., clock signals) may be transmitted between components in a very-large-scale integration (VLSI) system. Distribution of a master clock signal in a VLSI system may be achieved using a single channel coupled between a transmitter and a receiver. FIG. 1 illustrates a VLSI system 100 for clock distribution. The VLSI system 100 in FIG. 1 includes a transmitter 101, a plurality of receivers 103, 103', 103", and a single distribution channel 105, 105', 105" between the transmitter 101 and each receiver 103, 103', 103". A master clock signal is transmitted from the transmitter 101 to a receiver 103, 103', 103" through its corresponding single distribution channel 105, 105', 105".

Each distribution channel 105, 105', 105" is associated with parasitic resistances and capacitances. Parasitic resistances and capacitances associated with a channel 105, 105', 105" effectively act as a low-pass filter to the master clock signal being transmitted from the transmitter 101 to the receiver 103, 103', 103" associated with that channel 105, 105', 105". Thus, master clock signals operating at a high frequency experience significant power attenuation when being transmitted across a single distribution channel 105, 105', 105". Additionally, as the channel length increases, so too do the parasitic resistances and capacitances associated with the channel 105, 105', 105". This in turn increases the power attenuation experienced by high frequency master clock signals transmitted across the channel.

At the receiver 103, 103', 103" side, the received master clock signal must meet a minimum power threshold in order to be properly reconstructed. One approach for maintaining a power level sufficient to meet the minimum power threshold is to drive the master clock signal at a higher power from the transmitter 101. However, at higher frequencies, power attenuation is significantly more prominent and as such simply increasing the driving power at the transmitter 101 for such high frequencies may not be sufficient to meet the minimum power threshold required at the receiver 103, 103', 103". Moreover, it may be desirable to limit the driving power used to drive the master clock signal in order to optimize performance of VLSI systems.

Rather than increasing the power of a master clock signal being transmitted across a single distribution channel to overcome the power attenuation due to parasitics, the master clock signal may instead be split into multiple lower-frequency sub-clocks and transmitted across multiple corresponding distribution channels. The multiple lower-frequency sub-clocks may then be reconstructed at the receiver to generate the original master clock signal. In this way, the lower-frequency sub-clocks may each be transmitted across a distribution channel with significantly less driving power because the lower-frequency sub-clocks suffer from less power attenuation due to their lower operating frequency.

Figure 2:
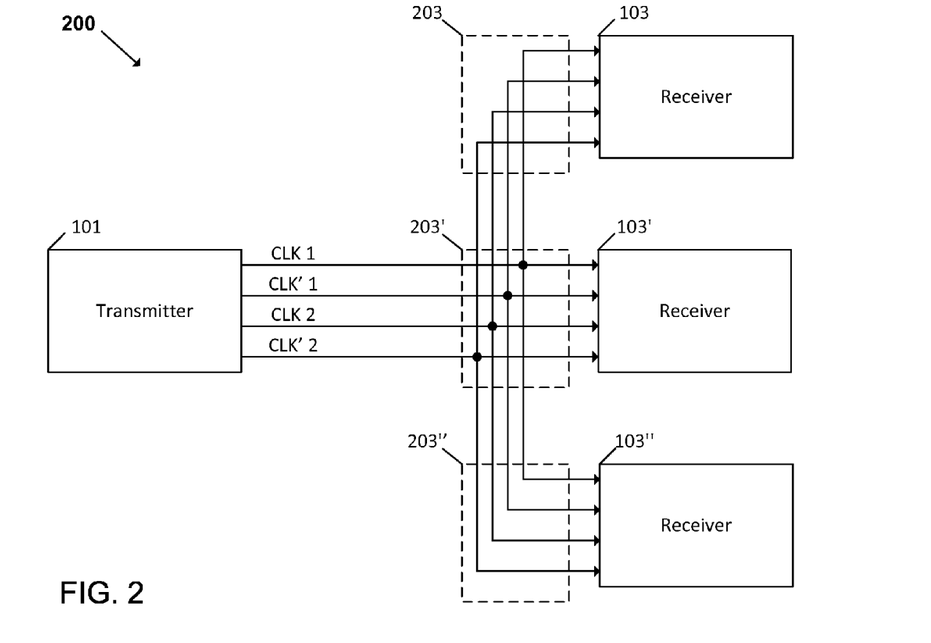
FIG. 2 illustrates a VLSI system for high-frequency clock distribution according to some embodiments.

FIG. 2 illustrates a VLSI system 200 for high-frequency clock distribution according to some embodiments. The VLSI system 200 includes a transmitter 101, a plurality of receivers 103, 103', 103", and multiple groups of distribution channels 203, 203', 203". Rather than transmitting a single master clock signal across a single distribution channel 105, 105', 105" as shown in FIG. 1, the original master clock signal is instead split into one or more pairs of lower-frequency sub-clocks CLK1, CLK'1, CLK2, CLK'2 that are transmitted across corresponding groups of distribution channels 203, 203', 203". Each group of distribution channels 203, 203', 203" comprises one or more pairs of distribution channels corresponding to the one or more pairs of lower-frequency sub-clocks. It should be noted that as used in this specification, the term "original master clock signal" may refer to a master clock signal that is originally generated or provided (e.g., from a transmitter or another device), or may refer to a master clock signal that is a duplicate of an initially generated or provided master clock signal. Thus, the term "original master clock signal" should not be limited to a master clock signal that is initially generated or provided, and may refer to a copy of the initially generated or provided master clock signal, or a parameter that represents the master clock signal.

For example, in the VLSI system 200 of FIG. 2, the original master clock signal is split into 2 pairs of lower-frequency sub-clocks CLK1, CLK'1, CLK2, CLK'2 at the transmitter 101, which are then transmitted across groups of distribution channels 203, 203', 203" that each comprise two pairs of corresponding distribution channels to a corresponding receiver 103, 103', 103". At each receiver 103, 103', 103", a reference master clock signal that replicates the original master clock signal is reconstructed using the 2 pairs of lower-frequency sub-clocks CLK1, CLK'1, CLK2, CLK'2, which will be described in further detail below. It should be understood that the reconstructed reference master clock signal replicates the original master clock signal, and thus, the reconstructed reference master clock signal may be considered a reconstruction of the original master clock signal.

While the VLSI system 200 in FIG. 2 depicts 2 pairs of lower-frequency sub-clocks CLK1, CLK'1, CLK2, CLK'2 being transmitted across distribution channel groups 203, 203', 203" that comprise 2 corresponding pairs of distribution channels, one ordinarily skilled in the art will recognize that the VLSI system 200 may be extended to transmit any number of lower-frequency sub-clock pairs across distribution channel groups comprising any number of corresponding distribution channel pairs.

Figure 3:
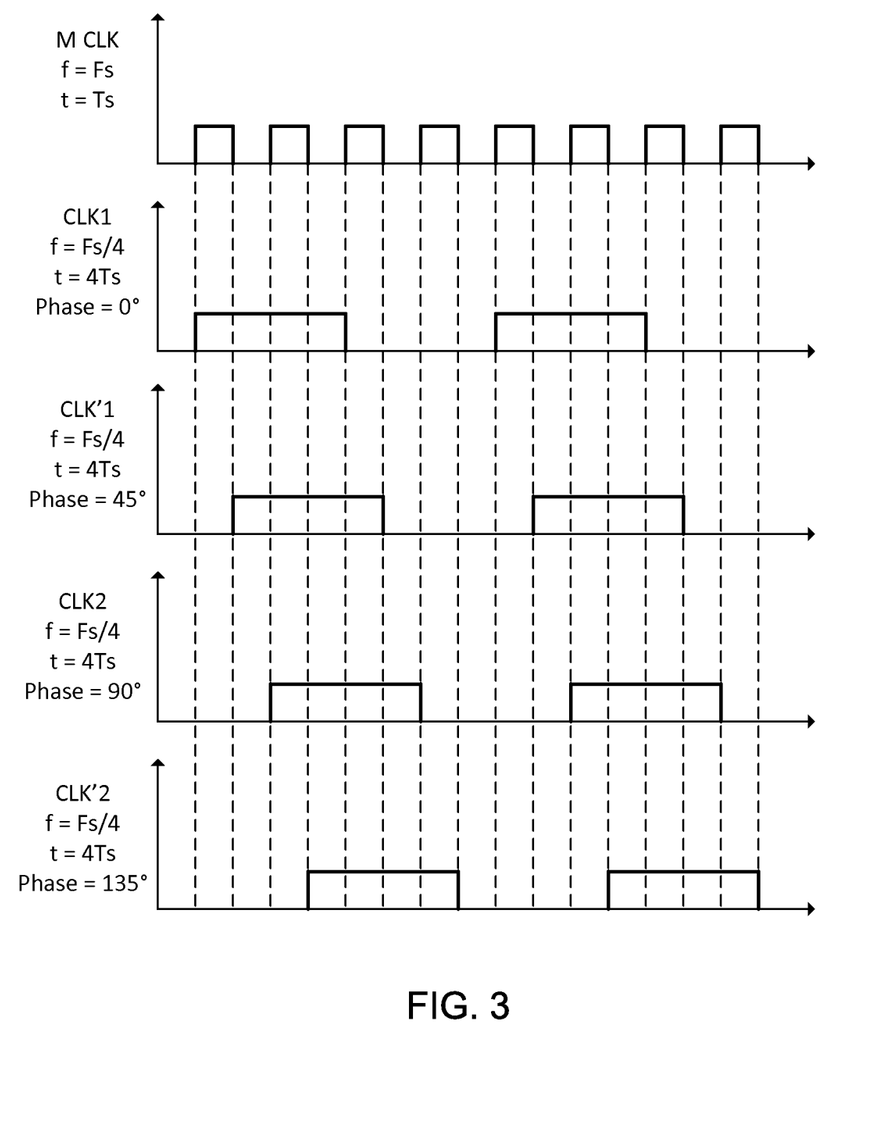
FIG. 3 illustrates a graphical representation of a master clock signal being split into multiple lower-frequency sub-clock pairs according to some embodiments.

FIG. 3 illustrates a graphical representation of an original master clock signal being split into multiple lower-frequency sub-clock pairs according to some embodiments. For purposes of example, FIG. 3 illustrates a single original master clock signal MCLK being split into 2 lower-frequency sub-clock pairs CLK1, CLK'1, CLK2, CLK'2, however one ordinarily skilled in the art will recognize that the original master clock signal may be split into any number of lower-frequency sub-clock pairs.

The original master clock signal in FIG. 3 has a fundamental frequency of Fs and a period of Ts. The lower-frequency sub-clocks CLK1, CLK'1, CLK2, CLK'2 each have a fundamental frequency of Fs/4 and a period of 4Ts. The fundamental frequency of the lower-frequency sub-clocks is dependent on the total number of lower-frequency sub-clock pairs. N lower-frequency sub-clock pairs will operate at a fundamental frequency of Fs/(2N) for an original master clock signal operating at a fundamental frequency of Fs.

The lower-frequency sub-clocks CLK1, CLK'1, CLK2, CLK'2 are phase-shifted versions of each other, with the first lower-frequency sub-clock CLK1 having a phase of 0°, the second lower-frequency sub-clock CLK'1 having a phase of 45°, the third lower-frequency sub-clock CLK2 having a phase of 90°, and the fourth lower-frequency sub-clock CLK'2 having a phase of 135°. The phase shift between lower-frequency sub-clocks of a lower-frequency sub-clock pair is dependent on the total number of lower-frequency sub-clock pairs. In some embodiments, the magnitude of phase shift between a lower-frequency sub-clock and its preceding lower-frequency sub-clock (e.g., between CLK'1 and CLK 1) is 180/(2N), where N is total number of lower-frequency sub-clock pairs. However, one ordinarily skilled in the art will recognize that the original master clock signal may be split into various numbers of lower-frequency sub-clock pairs with various magnitudes of phase shift between lower-frequency sub-clocks.

The original master clock signal MCLK may be later reconstructed using the 2 lower-frequency sub-clock pairs CLK1, CLK'1, CLK2, CLK'2 which will be described in further detail below. The rising and falling edges of the original master clock MCLK are reconstructed using the rising and falling edges of the lower-frequency sub-clock pairs CLK1, CLK'1, CLK2, CLK'2. For example, the rising edges of the first pulse of the original master clock signal MCLK may be reconstructed using the rising edges of the first lower-frequency sub-clock CLK1 and the rising of the second lower-frequency sub-clock CLK'1. Likewise, the rising and falling edges of the third pulse of the original master clock signal MCLK may also be reconstructed using the falling edges of the first lower-frequency sub-clock CLK1 and the falling edges of the second lower-frequency sub-clock CLK'1. The rising and falling edges of the second pulse of the original master clock signal MCLK may be reconstructed using the rising edges of the third lower-frequency sub-clock CLK2 and the rising edges of the fourth lower-frequency sub-clock CLK'2. Likewise, the rising and falling edges of the fourth pulse of the original master clock signal MCLK may also be reconstructed using the falling edges of the third lower-frequency sub-clock CLK2 and the falling edges of the fourth lower-frequency sub-clock CLK'2. This may continue for any number of pulses.

As such, it can be seen that the lower-frequency sub-clock pairs CLK1, CLK'1, CLK2, CLK'2 can be used to reconstruct the original master clock signal MCLK. By splitting the original master clock signal into one or more pairs of lower-frequency sub-clocks, the parasitic effects (e.g., power attenuation) of the distribution channels may be significantly reduced without requiring a significant increase in driving power at the transmitter, which will be discussed in further detail below.

Figure 4:
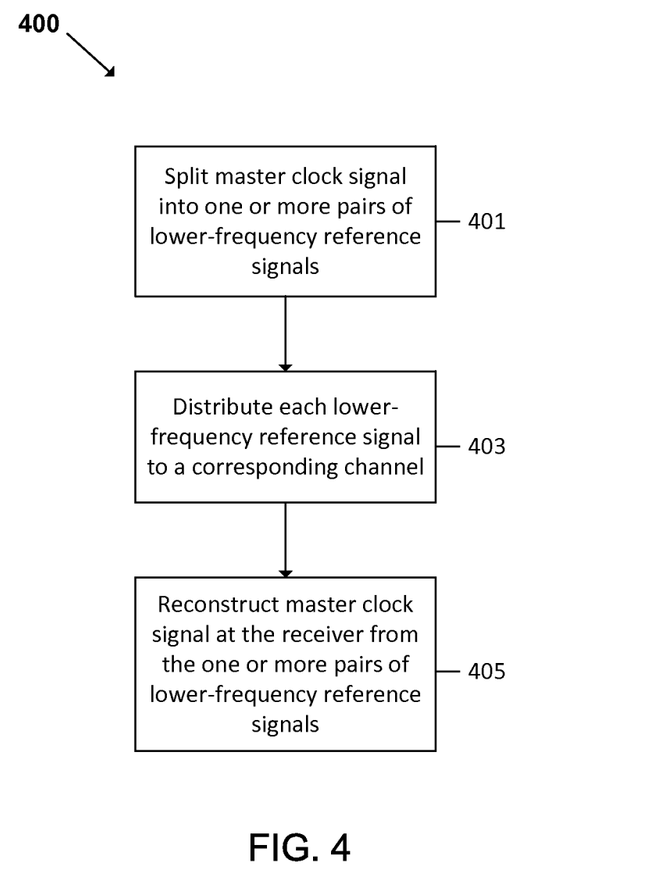
FIG. 4 is a flow diagram illustrating a method for performing high-frequency clock distribution according to some embodiments.

FIG. 4 is a flow diagram 400 illustrating a method for performing high-frequency clock distribution according to some embodiments. The method begins by splitting an original master clock signal into one or more pairs of lower-frequency sub-clocks as described at 401. The number of lower-frequency sub-clock pairs that the master clock signal is split into may be based in part upon a frequency of the original master clock signal. An original master clock signal operating at a very high frequency may need to be split into more than one pair of lower-frequency sub-clocks in order to overcome the parasitic characteristics of the distribution channels. However an original master clock signal operating at a lower frequency may only need to be split into a single lower-frequency sub-clock pair in order to overcome the parasitic characteristics of the distribution channel. For example, an original master clock signal operating at a fundamental frequency of Fs=10 GHz may need to be split into 2 pairs of lower-frequency sub-clocks, where each lower-frequency sub-clock operates at a fundamental frequency of Fs/4=2.5 GHz, in order to overcome the parasitic characteristics of the distribution channel. However an original master clock signal operating at a fundamental frequency of Fs=5 GHz may only need to be split into a single pair of lower-frequency sub-clocks, where each lower-frequency sub-clock operates at a fundamental frequency of Fs/2=2.5 GHz, in order to overcome the parasitic characteristics of the distribution channel.

The number of lower-frequency sub-clock pairs that the original master clock signal is split into may also be based in part upon attenuation characteristics (e.g., parasitic characteristics) of distribution channels. A VLSI system with distribution channels that are characterized by very high power attenuation may necessitate the splitting of an original master clock signal into several pairs of lower-frequency sub-clocks in order to overcome the parasitic characteristics of the distribution channels. However, for a VLSI system with distribution channels that are characterized by lower power attenuation, an original master clock signal may be split into a single pair of lower-frequency sub-clocks to overcome the parasitic characteristics of the distribution channels.

As mentioned above, the fundamental frequency of the lower-frequency sub-clocks is dependent on the total number of lower-frequency sub-clock pairs. N lower-frequency sub-clock pairs will operate at a fundamental frequency of Fs/(2N) for a master clock signal operating at fundamental frequency of Fs.

Additionally, each lower-frequency sub-clock of a pair of lower-frequency sub-clocks is a phase shifted version of its counterpart. As mentioned above, the phase shift between lower-frequency sub-clocks of a lower-frequency sub-clock pair is dependent on the total number of lower-frequency sub-clock pairs. In some embodiments, the magnitude of phase shift between each lower-frequency sub-clock of a lower-frequency sub-clock pair is 180/(2N), where N is total number of lower-frequency sub-clock pairs. For example, where an original master clock signal is split into a single pair of lower-frequency sub-clocks, the phase shift between each lower-frequency sub-clock of the lower-frequency sub-clock pair may be 90°.

Once the original master clock signal has been split into one or more pairs of lower-frequency sub-clocks, these lower-frequency sub-clocks are distributed across corresponding distribution channels as described at 403. For example, an original master clock signal that is split into 2 pairs of lower-frequency sub-clocks may be transmitted across 2 pairs of corresponding distribution channels. The lower-frequency sub-clocks may still undergo some power attenuation due to the parasitic characteristics of the distribution channels, however, because of their lower fundamental frequency the magnitude of power attenuation is significantly reduced. This in turn allows the lower-frequency sub-clocks to be driven at a lower power.

When the one or more pairs of lower-frequency sub-clocks arrive at the receiver, they are used to reconstruct the original master clock signal as described at 405. Because each lower-frequency sub-clock is substantially shielded from power attenuation caused by distribution channel parasitics due to their lower fundamental frequency, they individually meet minimum power threshold requirements necessary to reconstruct the original master clock signal. In reconstructing the original master clock signal from the one or more pairs of lower-frequency sub-clocks, the receiver may perform error correction, which will be discussed in further detail below.

Thus, by splitting the original master clock signal into one or more pairs of lower-frequency sub-clocks, the parasitic effects (e.g., power attenuation) of the distribution channels may be significantly reduced without requiring a significant increase in driving power at the transmitter.

Figure 51:
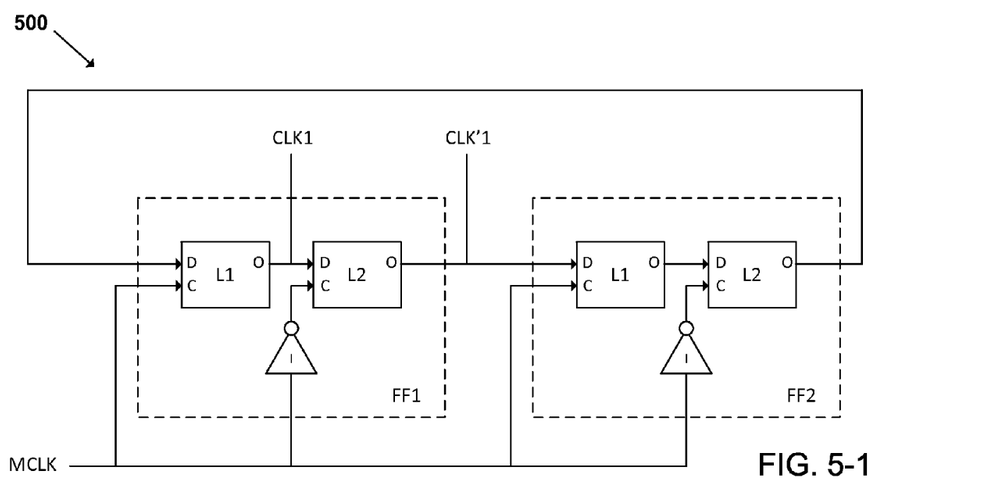

In some embodiments, the original master clock signal may be split into one or more pairs of lower-frequency sub-clocks using a ring-shift register. FIG. 5-1 illustrates a ring-shift register 500 for generating sub-clocks according to some embodiments. For purposes of example, the ring shift register 500 will be described with respect to splitting an original master clock signal MCLK into a single pair of lower-frequency sub-clocks CLK1, CLK'1. However, one ordinarily skilled in the art will recognize that the ring shift register 500 in FIG. 5-1 may be extended to split an original master clock signal MCLK into any number of lower-frequency sub-clock pairs.

The ring-shift register 500 includes 2 flip flops FF1, FF2. Each flip flop FF1, FF2 includes a pair of latches L1, L2 and an inverter I. For each flip flop FF1, FF2, a clock input C of the first latch L1 is coupled to the original master clock signal MCLK and a clock input C of the second latch L2 is coupled to the original master clock signal MCLK through the inverter I. An output O of each latch L1, L2 is coupled to a data input D of a subsequent latch, with the second latch L2 of the last flip flop FF2 being coupled to a data input D of the first latch L1 of the first flip flop FF1 to form a ring.

Initially, each flip flop FF1, FF2 is initialized to an initial state. For example, the first flip flop FF1 may be initialized to an "on" state and the second flip flop FF2 may be initialized to an "off" state, or vice versa. During operation, the state of the flip flops FF1, FF2 are rotated (e.g., state of the first flip flop FF1 is passed to the second flip flop FF2, and the state of the second flip flop FF2 is passed to the first flip flop FF1) at the rate specified by the original master clock MCLK.

A first lower-frequency sub-clock CLK1 of the lower-frequency sub-clock pair is generated at the output O of the first latch L1 of the first flip flop FF1 and a second lower-frequency sub-clock CLK'1 of the lower-frequency sub-clock pair is generated at the output O of the second latch L2 of the first flip flop FF2.

For an original master clock signal with a fundamental frequency of Fs and a period of Ts, each lower-frequency sub-clock of the pair will have a fundamental frequency of Fs/2 and a period of 2Ts. The second lower-frequency sub-clock CLK'1 will be a phase-shifted version of the first lower-frequency sub-clock CLK1, as discussed above. For example, the second-lower frequency sub-clock CLK'1 may have a phase of 90° and the first lower-frequency sub-clock CLK1 may have a phase of 0°.

The lower-frequency sub-clock pair CLK1, CLK'1 generated by the ring-shift register 500 of FIG. 5-1 may then be transmitted across corresponding distribution channels to a receiver as described above. While the ring-shift register 500 of FIG. 5-1 is configured to generate a single pair of lower-frequency sub-clocks from an original master clock signal, one ordinarily skilled in the art will recognize that the ring shift register 500 in FIG. 5-1 may be extended to split an original master clock signal MCLK into any number of lower-frequency sub-clock pairs with different phases.

Figure 52:
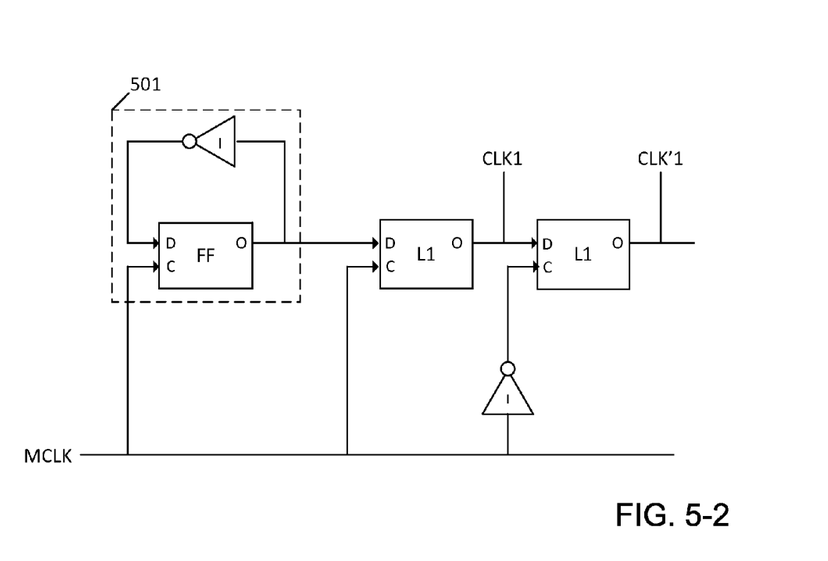

In some other embodiments, an original master clock signal may be split into one or more pairs of lower-frequency sub-clocks using a splitter that includes a frequency divider and a shift register. FIG. 5-2 illustrates a splitter 500' that includes a frequency divider 501 and a shift register 503 for generating sub-clocks according to some embodiments. For purposes of example, the splitter 500' will be described with respect to splitting an original master clock signal MCLK into a single pair of lower-frequency sub-clocks CLK1, CLK'1.

The splitter 500' of FIG. 5-2 includes a single frequency divider 501 and a shift register 503 implemented to split an original master clock signal into a single pair of lower-frequency sub-clocks. The frequency divider 501 includes a flip flop FF and an inverter I. A clock input C of the flip flop FF is coupled to the original master clock signal MCLK. An output O of the flip flop FF is coupled to a data input D of the flip flop FF through the inverter I.

The shift register 503 includes two latches L1, L2 and an inverter I. A clock input C of the first latch L1 is coupled to the original master clock signal MCLK and a data input D of the first latch L1 is coupled to the output O of the flip flop FF of the frequency divider 501. A clock input C of the second latch L2 is coupled to the original master clock signal MCLK through an inverter I and a data input D of the second latch L2 is coupled to the output O of the first latch L1.

The output of the frequency divider 501 is a clock signal with a frequency that is half the magnitude of the frequency of the original master clock signal MCLK. This clock signal is fed to the shift register 503 which generates a pair of lower-frequency sub-clocks CLK1, CLK'1. A first lower-frequency sub-clock CLK1 is generated at the output O of the first latch L1 and a second lower-frequency sub-clock CLK'1 is generated at the output O of the second latch L2. For an original master clock signal MCLK with a fundamental frequency of Fs and a period of Ts, each lower-frequency sub-clock of the pair will have a fundamental frequency of Fs/2 and a period of 2Ts. The second lower-frequency sub-clock CLK'1 will be a phase-shifted version of the first lower-frequency sub-clock CLK1, as discussed above. For example, the second-lower frequency sub-clock CLK'1 may have a phase of 90° and the first lower-frequency sub-clock CLK1 may have a phase of 0°.

While the splitter of FIG. 5-2 is configured to generate a single pair of lower-frequency sub-clocks from an original master clock signal, one ordinarily skilled in the art will recognize that the frequency divider and shift register in FIG. 5-2 may be extended to split an original master clock signal MCLK into any number of lower-frequency sub-clock pairs with different phases.

Ideally an original master clock signal MCLK is split into one or more pairs of lower-frequency sub-clocks that may be combined to reconstruct a reference master clock signal that replicates the original master clock signal without any error correction. However, due to various errors (e.g., unmatched propagation delays, unmatched delays in logic gates, unmatched generation of sub-clocks, etc.) that occur during the splitting, transmission, and reconstruction, the one or more pairs of lower-frequency sub-clocks will typically suffer from timing errors such as duty-cycle mismatch (e.g., duty cycle of lower-frequency sub-clocks does not match duty cycle of original master clock signal) or phase-shift mismatch (e.g., phase-shift difference of lower-frequency sub-clocks is mismatched). As used herein, the term "duty cycle" refers to the percentage of a clock signal period in which the clock signal is in an "on state". In situations where timing errors occur either due to duty-cycle mismatch or phase-shift mismatch of lower-frequency sub-clocks, error correction must be performed at the receiver in order to reconstruct the original master clock signal.

Figure 61:
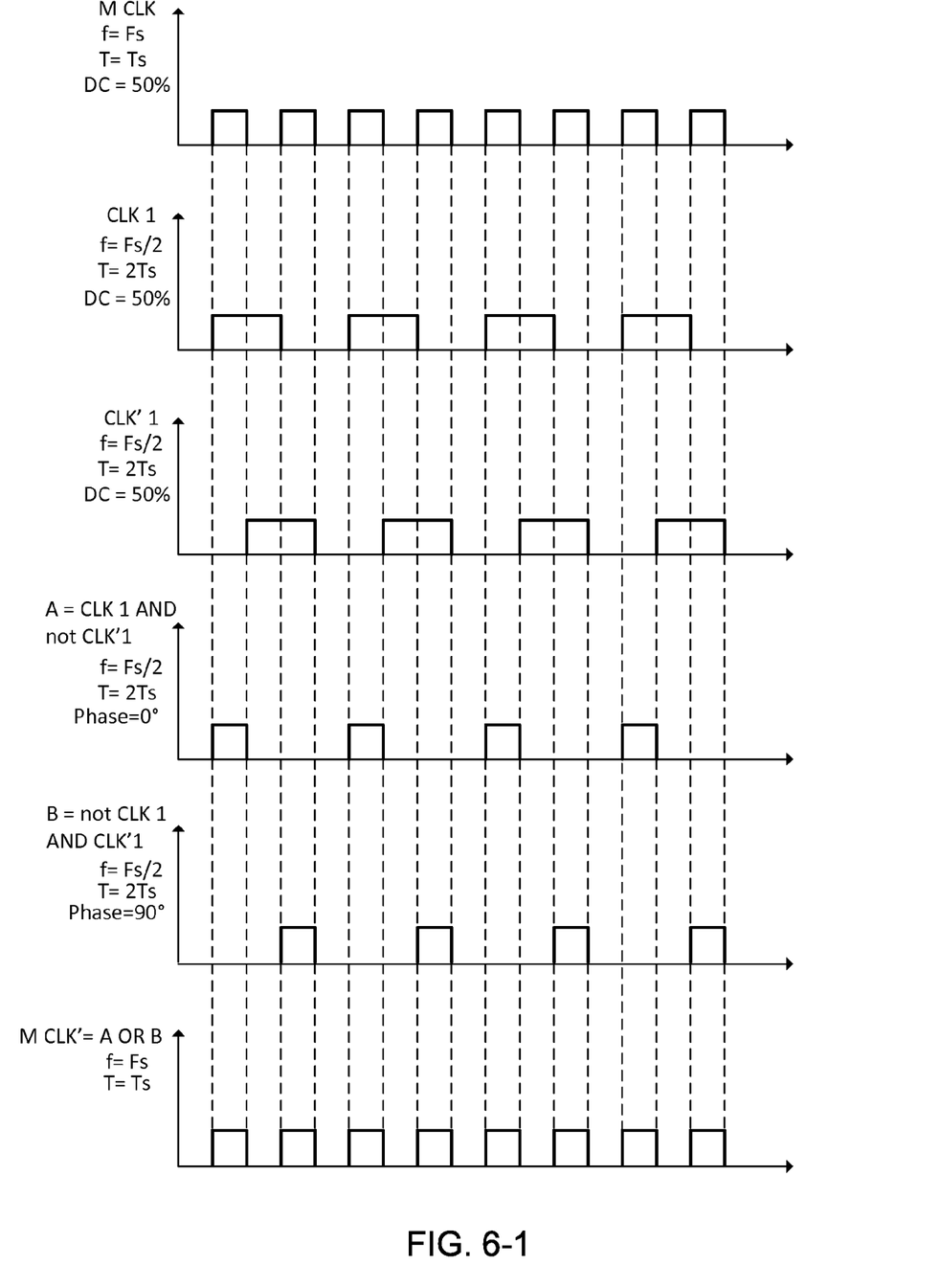
Figure 62:
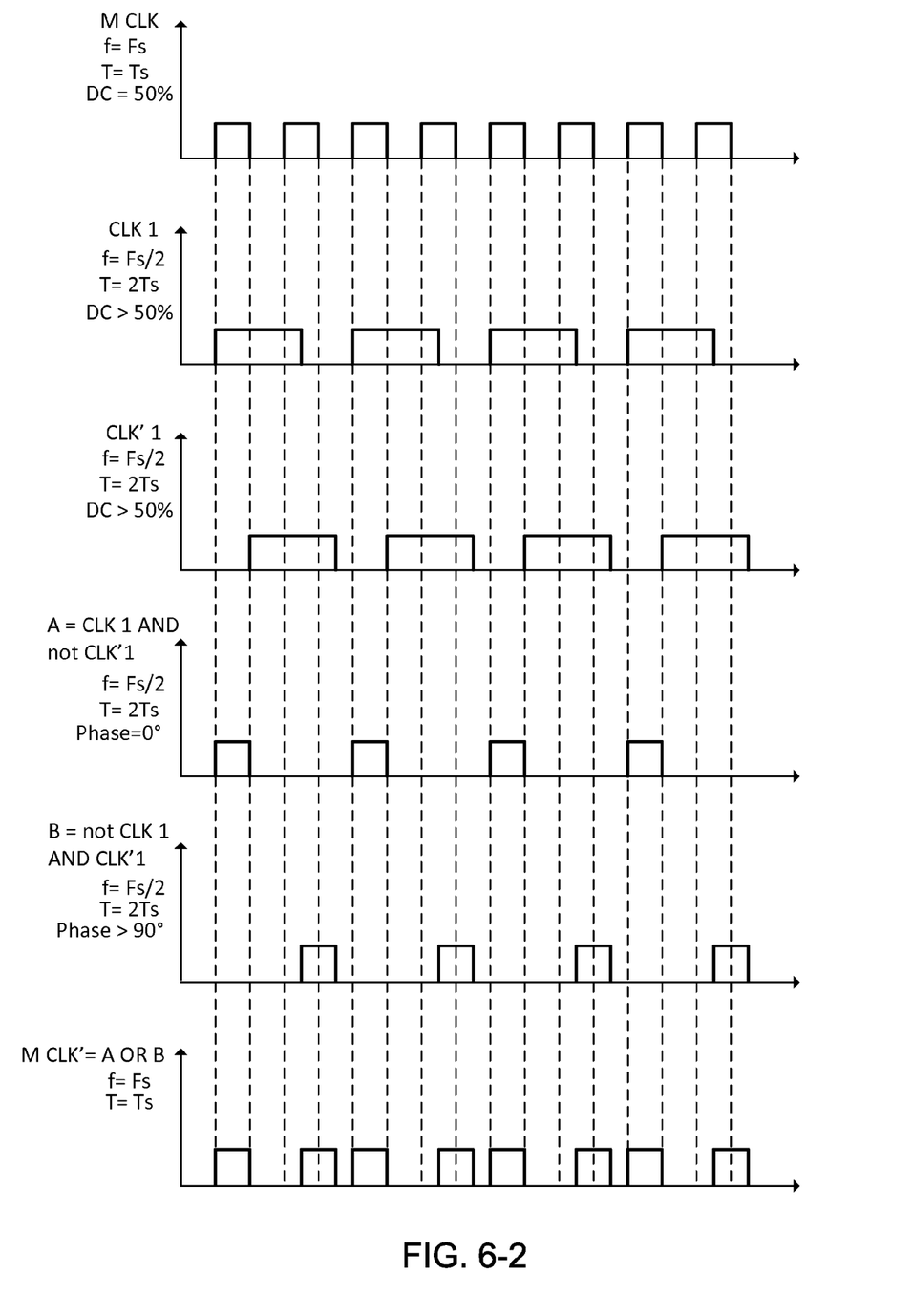

FIGS. 6-1 and 6-2 illustrate the effects of timing errors that occur during the splitting of an original master clock signal, the transmission of lower-frequency sub-clocks, and the reconstruction of a reference master clock signal. FIGS. 6-1 and 6-2 illustrate these effects with respect to splitting an original master clock signal into a single pair of lower-frequency sub-clocks. However, one ordinarily skilled in the art will recognize that these effects will exist for any number lower-frequency sub-clock pairs. For purposes of example, the effect of timing errors that occur during the splitting of a master clock signal will be described with respect to duty-cycle mismatch of lower-frequency sub-clocks. However, one ordinarily skilled in the art will recognize that phase-shift mismatch between lower-frequency sub-clocks may also occur, which ultimately leads to similar timing error effects.

FIG. 6-1 illustrates an original master clock signal MCLK split into a single pair of lower-frequency sub-clocks CLK1, CLK'1 without timing errors and its subsequent reconstruction. As illustrated an original master clock signal MCLK operating at a fundamental frequency Fs is split into a single pair of lower-frequency sub-clocks CLK1, CLK'1, each operating at a fundamental frequency of Fs/2. In an ideal situation, the duty cycle DC of the first lower-frequency sub-clock CLK1 is equivalent to the duty cycle DC of the original master clock signal MCLK and the duty cycle DC of the second lower-frequency sub-clock CLK'1 is equivalent to the duty cycle DC of the original master clock signal MCLK. Likewise, in an ideal situation no phase mismatch exists between lower-frequency reference sub-clocks (e.g., CLK'1 is a 90° phase-shifted version of CLK1). This results in a reconstructed reference master clock signal MCLK' that replicates the original master clock signal MCLK. Here, the duty cycle DC of the first lower-frequency sub-clock CLK1, the duty cycle of the second lower-frequency sub-clock CLK'1, and the duty cycle of the original master clock signal MCLK are all 50%. Likewise, the second lower-frequency sub-clock CLK'1 is a 90° phase-shifted version of the first lower-frequency sub-clock CLK1 (e.g., no phase mismatch).

When an original master clock signal MCLK is split into one or more pairs of lower-frequency sub-clocks CLK1, CLK'1 without timing errors (e.g., no duty cycle mismatch or phase mismatch), the reference master clock signal MCLK' can be reconstructed to replicate the original master clock signal MCLK by simply combining the lower-frequency sub-clocks CLK1, CLK'1. A first intermediate signal A can be generated by performing a logic AND operation on CLK1 and not CLK'1. A second intermediate signal B can be generated by performing a logic AND operation on not CLK1 and CLK'1. A reconstructed reference master clock signal MCLK' that replicates the original master clock signal MCLK may then be generated by performing a logic OR operation on intermediate signal A and intermediate signal B. The reconstructed reference master clock signal MCLK' will replicate the original master clock signal since there is no duty cycle mismatch or phase mismatch between lower-frequency sub-clock pairs.

However, as discussed above, due to various errors (e.g., unmatched propagation delays, unmatched delays in logic gates, unmatched generation of lower-frequency sub-clocks, etc.) associated with the splitting of the original master clock signal, the transmission of lower-frequency sub-clocks, and the reconstruction of master clock signals, each pair of lower-frequency sub-clocks typically suffers from at least some duty cycle mismatch or phase mismatch.

FIG. 6-2 illustrates an original master clock signal MCLK split into a single pair of lower-frequency sub-clocks CLK1, CLK'1 with duty cycle mismatch and its subsequent reconstruction. For purposes of illustration, the timing error effects associated with the splitting of the original master clock signal, transmission of lower-frequency sub-clocks, and reconstruction of master clock signals will be described with reference to duty cycle mismatch between lower-frequency sub-clocks, however it is important to note that similar timing error effects may result from phase mismatch between lower-frequency sub-clocks.

As illustrated, an original master clock signal MCLK operating at a fundamental frequency of Fs is split into a single pair of lower-frequency sub-clocks CLK1, CLK'1, each operating at a fundamental frequency of Fs/2. Because of the various errors mentioned above, the duty cycle DC of the first lower-frequency sub-clock CLK1 and the duty cycle DC of the second lower-frequency sub-clock CLK'1 will be different than the duty cycle DC of the master clock signal MCLK. In FIG. 6-2, the master clock signal MCLK has a duty cycle of 50%, while the first and second sub-clocks CLK1, CLK'1 have duty cycles greater than 50%.

When an original master clock signal MCLK having a particular duty cycle DC is split into one or more pairs of lower-frequency sub-clocks with duty cycle mismatch, a reference master clock signal MCLK' cannot be reconstructed to replicate the original master clock signal MCLK by simply combining the lower-frequency sub-clocks. Combining the lower-frequency sub-clocks as in FIG. 6-2 will result in a reconstructed reference master clock signal MCLK' that contains sub harmonics and fails to replicate the original master clock signal MCLK. This is illustrated in FIG. 6-2, where a first intermediate signal A is generated by performing a logic AND operation on CLK1 and not CLK'1. A second intermediate signal B is also generated by performing a logic AND operation on not CLK1 and CLK'1. The first intermediate signal A and the second intermediate signal B are phase mismatched due to the duty cycle mismatch between the lower-frequency sub-clocks CLK1, CLK'1. In this example, the second intermediate signal B should ideally be a 90° phase shifted version of the first intermediate signal A in order to reconstruct the original master clock signal MCLK. However because of the duty cycle mismatch between the lower-frequency sub-clocks CLK1, CLK'1, the first intermediate signal A and the second intermediate signal B are phase mismatched, with the second intermediate signal B having a phase-shift greater than 90° in comparison to the first intermediate signal A. This results in a reconstructed reference master clock signal MCLK' that fails to replicate the original master clock signal MCLK when a logic OR operation is performed on intermediate signal A and intermediate signal B to generate the reconstructed reference master clock signal MCLK'.

Thus, reconstruction of the reference master clock signal to replicate the original master clock signal requires error correction (e.g., time calibration) to correct the duty cycle mismatch for pairs of lower-frequency sub-clocks. As noted above, one ordinarily skilled in the art will recognize that reconstruction of the reference master clock signal to replicate the original master clock signal may also require error correction to correct phase mismatch for pairs of lower-frequency sub-clocks.

Figure 7:
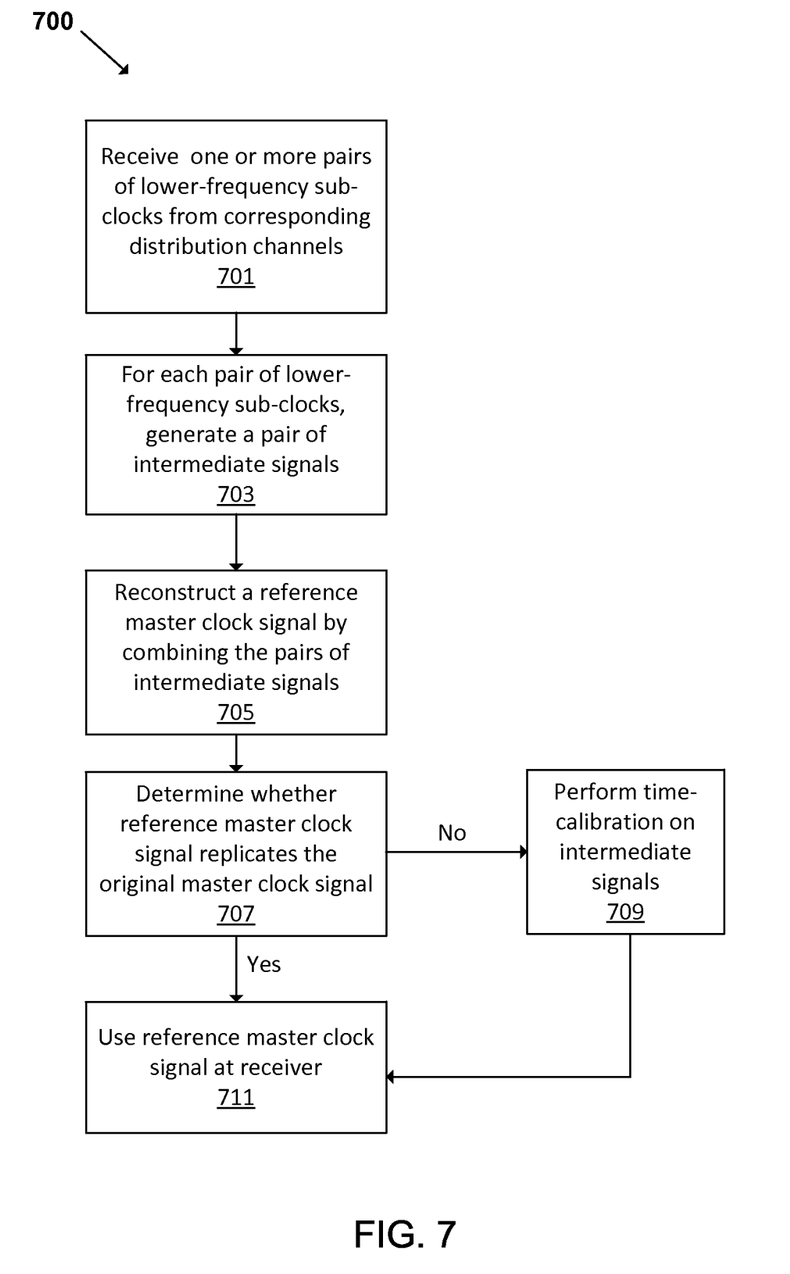
FIG. 7 is a flow diagram illustrating a method for reconstructing a high-frequency master-clock signal from one or more pairs of lower-frequency sub-clocks that suffer from duty cycle mismatch according to some embodiments.

FIG. 7 is a flow diagram 700 illustrating a method for reconstructing a reference master-clock signal that replicates an original master clock signal from one or more pairs of lower-frequency sub-clocks that suffer from timing errors according to some embodiments. As noted above, such timing errors may be associated with duty cycle mismatch or phase mismatch between lower-frequency sub-clocks.

Initially one or more pairs of lower-frequency sub-clocks are received from the corresponding distribution channels as described at 701. As discussed above, each lower-frequency sub-clock of a pair of lower-frequency sub-clocks will suffer from some sort of timing errors due to various errors incurred during the splitting of the original master clock signal, transmission of the lower-frequency sub-clocks, and reconstruction of the master clock signal.

For each pair of lower-frequency sub-clocks, a pair of intermediate signals are generated as described at 703. For example, a first intermediate signal may be generated for a pair of lower-frequency sub-clocks by performing a logic AND operation on the first lower-frequency sub-clock of the pair of lower-frequency sub-clocks and an inverted second lower-frequency sub-clock of the pair of lower-frequency sub-clocks. A second intermediate signal may be generated for the pair of lower-frequency sub-clocks by performing a logic AND operation on an inverted first lower-frequency sub-clock of the pair of lower-frequency sub-clocks and the second lower-frequency sub-clock of the pair of lower-frequency sub-clocks.

A reference master clock signal may then be reconstructed by combining the pairs of intermediate signals as described at 705. For example, the reference master clock signal may be reconstructed by performing a logic OR operation on the first intermediate signal and the second intermediate signal from above.

A determination is then made for whether the reconstructed reference master clock signal replicates the original master clock signal as described at 707. In order to determine whether the reconstructed reference master clock signal replicates the original master clock signal, a duty cycle signal is created using either the rising edges or falling edges of the reconstructed reference master clock signal. The duty cycle signal alternates its state at either the rising edges or the falling edges of the reconstructed reference master clock signal. The duty cycle signal is used to determine whether the reconstructed reference master clock signal fails to replicate the original master clock signal. The duty cycle signal may be compared to a reference duty cycle signal to determine whether the reconstructed reference master clock signal fails to replicate the original master clock signal. Additional details describing how the duty cycle reference signal is used to determine whether the reconstructed reference master clock signal replicates the original master clock signal will be discussed below with respect to FIG. 8. As discussed above, the reconstructed reference master clock signal may fail to replicate the original master clock signal due to timing errors (e.g., duty cycle mismatch or phase mismatch) between lower frequency sub-clocks.

If it is determined that the reconstructed reference master clock signal fails to replicate the original master clock signal then time-calibration may be performed on the intermediate signals as described at 709. In some embodiments, time-calibration may be performed on one intermediate signal of each pair of intermediate signals. In other embodiments, time-calibration may be performed on both intermediate signals of each pair of intermediate signals.

In some embodiments, the performance of time-calibration may be incremental, such that multiple iterations of time-calibration are necessary to correct the timing errors associated with the lower-frequency sub-clocks so that the reconstructed reference master clock signal replicates the original master clock signal. In such embodiments, time-calibration is first performed on the intermediate signals to generate time-calibrated intermediate signals. The time-calibrated intermediate signals are used to reconstruct another reference master clock signal and a determination is again made for whether the reconstructed reference master clock signal replicates the original master clock signal. If it still fails to replicate the original master clock signal, another iteration of time-calibration is again performed on the intermediate signals and the newly time-calibrated intermediate signals are used to generate yet another reference master clocks signal. This continues until it is determined that the reconstructed reference master clock signal replicates the original master clock signal. Additional details of the incremental approach for performing time-calibration will be described below.

Once it is determined that the reconstructed reference master clock signal replicates the original master clock signal, the reconstructed reference master clock signal replicates the original master clock signal I can then be used at the receiver as described at 711.

As already discussed above, by transmitting one or more pairs of lower-frequency sub-clocks rather than a single high frequency master clock signal the parasitic effects (e.g., power attenuation) of the distribution channels may be significantly reduced without requiring a significant increase in driving power at the transmitter.

Figure 8:
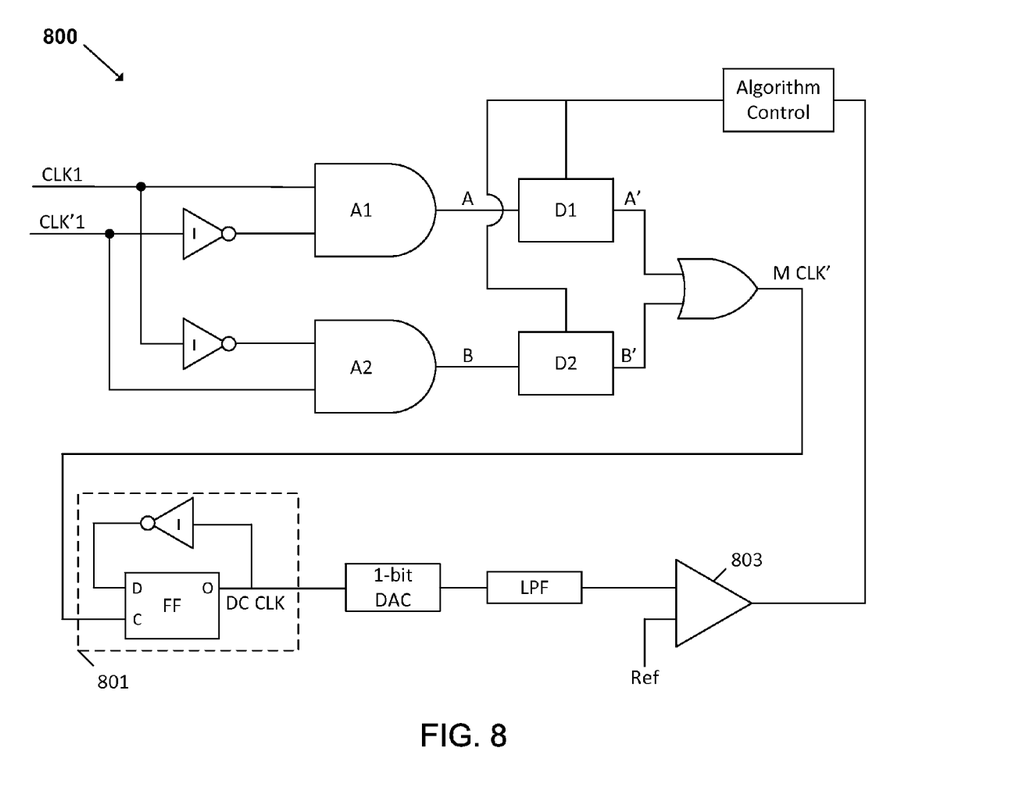
FIG. 8 illustrates a receiver-side component configured to reconstruct an original master clock signal from duty-cycle mismatched lower-frequency sub-clocks using time-calibration.
Figure 91:
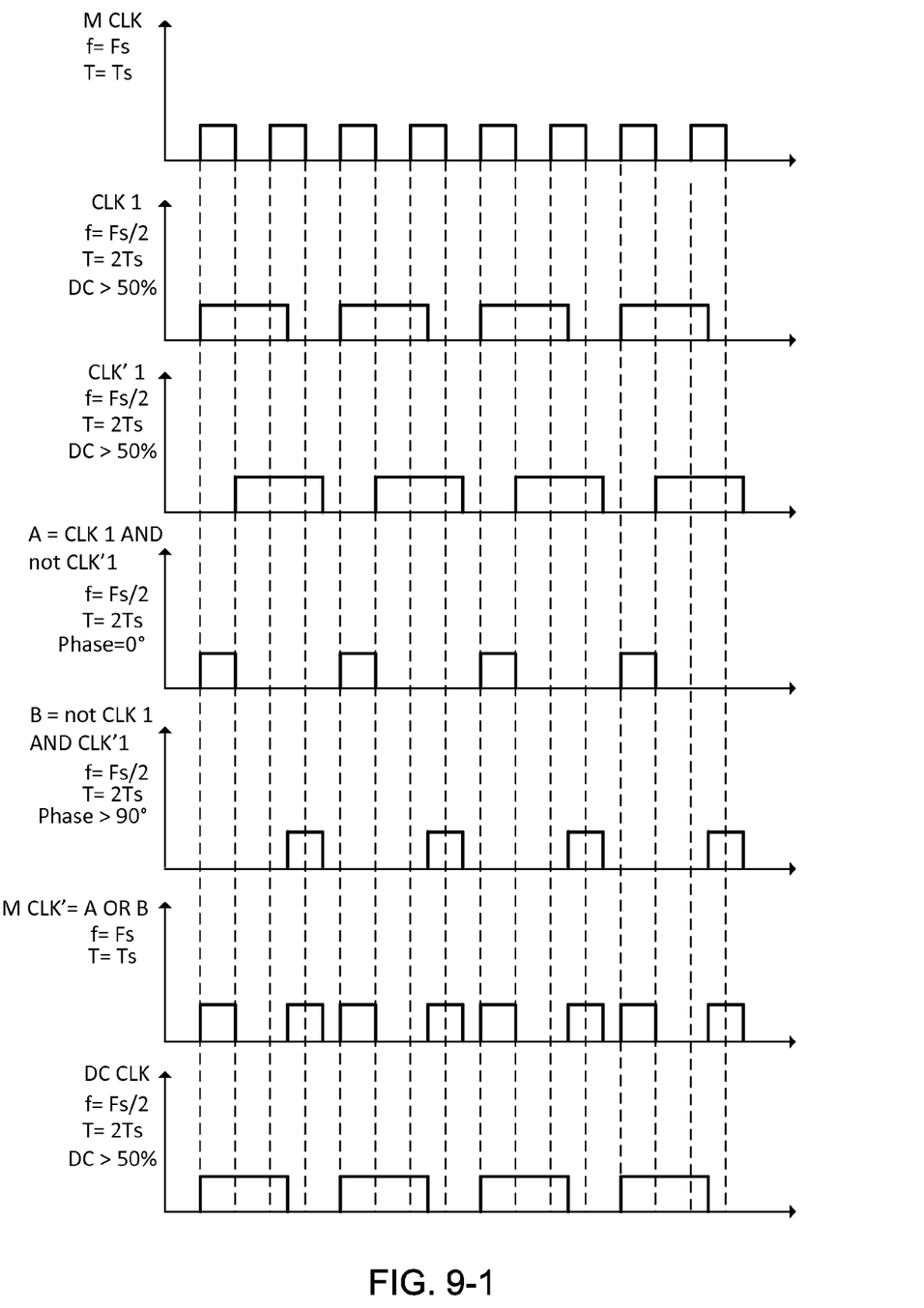
Figure 92:
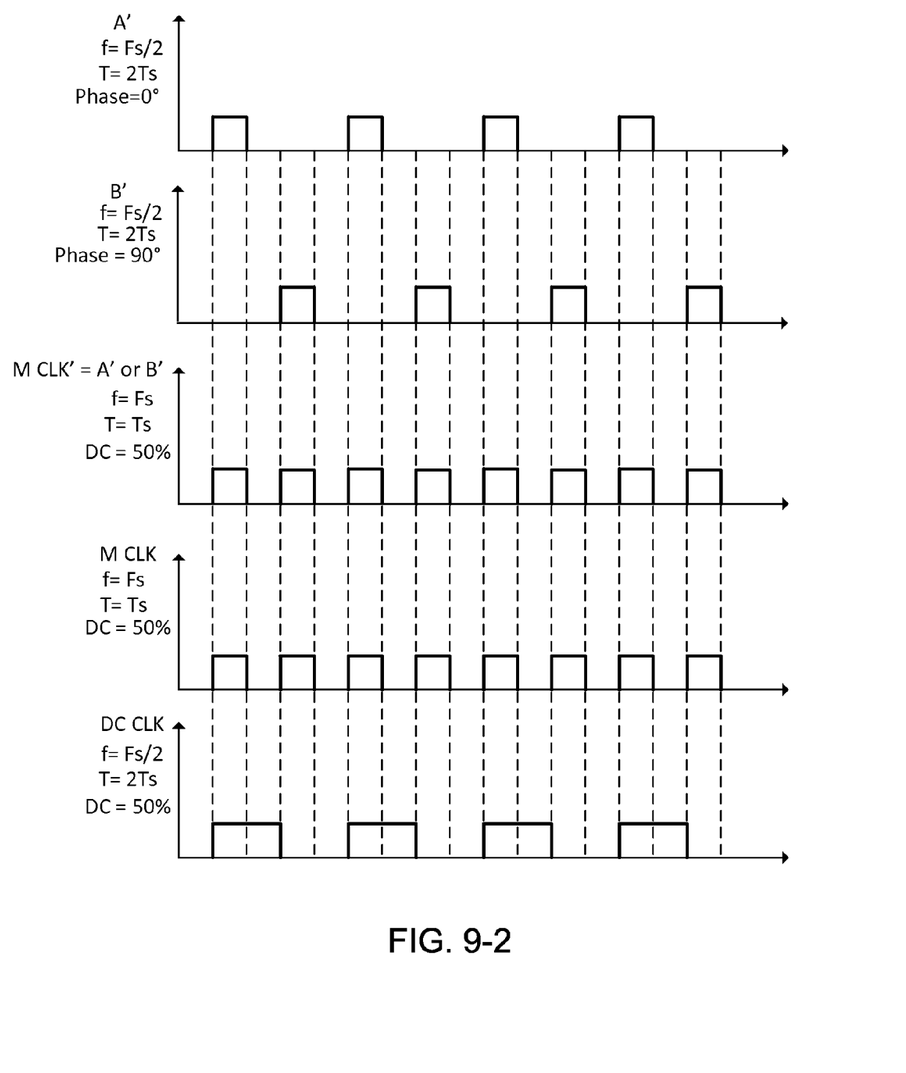

FIGS. 8 and 9 will now be used to illustrate a method for reconstructing a reference master clock signal that replicates the original master clock signal from lower-frequency sub-clocks that suffer from timing errors. FIGS. 8 and 9 should be viewed together. FIG. 8 illustrates a receiver-side component configured to perform a method for reconstructing a reference master clock signal that replicates an original master clock signal from lower-frequency sub-clocks that suffer from timing errors. FIG. 9 illustrates an example of the reconstruction of the reference master clock signal that replicates an original master clock signal using the receiver-side component of FIG. 8. FIG. 9 contains two parts, i.e., FIGS. 9-1 and 9-2.

For purposes of example, the method for reconstructing a reference master clock signal that replicates the original master clock signal will be described with reference to lower-frequency sub-clocks that suffer from duty cycle mismatch. However, it is important to note the method for reconstructing a reference master clock signal that replicates the original master clock signal may be extended to encompass lower-frequency sub-clocks that suffer from phase mismatch. Additionally, for purposes of example, the method for reconstructing a reference master clock signal that replicates the original master clock signal will be described with reference to a single pair of lower-frequency sub-clocks, however it is important to note that the method for reconstructing a reference master clock signal that replicates the original master clock signal may be extended to encompass any number of pairs of lower-frequency sub-clocks.

The receiver side component 800 in FIG. 8 comprises two AND gates A1, A2, two delay components D1, D2, an OR gate, a frequency divider 801, a 1-bit digital to analog converter (DAC), a low pass filter (LPF), a comparator 803, and an algorithm control module.

A first input of the first AND gate A1 is coupled to the first lower-frequency sub-clock CLK1 and a second input of the first AND gate A1 is coupled to the second lower-frequency sub-clock CLK1 through an inverter I. A first input of the second AND gate A2 is coupled to the first lower-frequency sub-clock CLK1 through an inverter I and the second input of the second AND gate A2 is coupled to the second lower-frequency sub-clock CLK2. A first delay element D1 is coupled between the output of the first AND gate A1 and a first input of the OR gate. A second delay element D2 is coupled between the output of the second AND gate A2 and a second input of the OR gate.

The frequency divider 801 comprises a flip flop FF and an inverter I. A clock input C of the flip flop FF is coupled to the output of the OR gate. An output O of the flip flop FF is coupled to a data input D of the flip flop FF through the inverter I. The output O of the flip flop FF is also coupled to an input of the 1-bit DAC. The output of the 1-bit DAC is coupled to an input of the LPF. The output of the LPF is coupled to an input of the 1-bit comparator 803. Another input of the 1-bit comparator 803 is coupled to a reference duty cycle signal Ref. An output of the 1-bit comparator 803 is coupled to the algorithm control module, which is coupled to both the first delay component D1 and the second delay component D2.

The first lower-frequency sub-clock CLK1, the second lower-frequency sub-clock CLK'1, and the original master clock signal MCLK are illustrated in FIG. 9-1. As illustrated, the first lower-frequency sub-clock CLK1 and the second lower-frequency sub-clock CLK1 are duty-cycle mismatched. The first lower-frequency sub-clock CLK1 and the second lower-frequency sub-clock CLK1 have duty cycles greater than 50%, whereas the original master clock signal MCLK has a duty cycle of exactly 50%.

The first AND gate A1 generates a first intermediate signal A1 at its output by performing a logic AND operation on the first lower-frequency sub-clock CLK1 and the inverted second lower-frequency sub-clock CLK1. The second AND gate A2 generates a second intermediate signal B at its output by performing a logic AND operation on the inverted first lower-frequency sub-clock CLK1 and the second lower-frequency sub-clock CLK'1. As illustrated in FIG. 9-1, the first intermediate signal A and the second intermediate signal B are phase mismatched with the second intermediate signal B having a phase-shift greater than 90° with respect to the first intermediate signal A. The phase mismatch between the intermediate signals A, B is due to duty cycle mismatch of the lower-frequency sub-clocks CLK1, CLK'1, as discussed above.

Shifting back to FIG. 8, during a first pass, the intermediate signals A, B bypass the first and second delay element D1, D2 and are combined at the OR gate to generate a reference master clock signal MCLK'. This reference master clock signal MCLK' is depicted in FIG. 9-1 and fails to replicate the original master clock signal MCLK (e.g., not all periods between the rising edges of the reconstructed reference master clock signal MCLK' match the periods between the rising edges of the original master clock signal MCLK).

In order to for the receiver side component 800 to determine whether the reference master clock signal MCLK' replicates the original master clock signal MCLK, the reference master clock signal MCLK' is first passed through the frequency divider 801 which generates a duty cycle signal DC CLK at its output. FIG. 9-1 illustrates the duty cycle signal DC CLK. The duty cycle of the duty cycle signal DC CLK represents the mismatch between the rising edges of the reference master clock signal MCLK' and the original master clock signal MCLK. The duty cycle signal DC CLK is then passed to the 1-bit DAC, which converts the duty cycle signal DC CLK from a digital signal to an analog signal. The converted duty cycle signal is then passed through a low pass filter LPF, before being fed to an input of the 1-bit comparator 803. At the other input of the 1-bit comparator 803, a reference duty cycle signal Ref that represents zero mismatch between the rising edges of the reference master clock signal MCLK' and the original master clock signal MCLK is received. In some embodiments, the reference duty cycle signal Ref can be derived from the original master clock signal MCLK in a similar manner to how the duty cycle signal DC CLK is derived from the reconstructed reference master clock signal MCLK'. In other embodiments, the reference duty cycle signal Ref can be provided by a reference generator.

The 1-bit comparator 803 makes a determination as to whether the reference master clock signal MCLK' replicates the original master clock signal MCLK. The 1-bit comparator 803 makes this determination by comparing the duty cycle signal DC CLK (after it has passed through the 1-bit DAC and the LPF) to the reference duty cycle signal Ref. If it is determined that the reference master clock signal MCLK' fails to replicate the original master clock signal MCLK, the output of the 1-bit comparator 803 is fed to the algorithm control module, which controls the time-calibration performed by the delay components D1, D2. The delay components may then perform time-calibration on the pair of intermediate signals A, B to generate a pair of time-calibrated intermediate signals A', B'. In some embodiments, time-calibration may be performed on one intermediate signal of the pair of intermediate signals A, B. In other embodiments, time-calibration may be performed on both intermediate signals of the pair of intermediate signals A, B.

In some embodiments, the time-calibration may be incremental, such that a multiple iterations of time-calibration are necessary to completely correct the timing errors associated with lower-frequency sub-clocks so that the reconstructed reference replicates the original master clock signal. In such embodiments, time-calibration is first performed on the intermediate signals to generate time-calibrated intermediate signals. The time-calibrated intermediate signals are used to reconstruct another reference master clock signal and a determination is again made for whether the other reconstructed reference master clock signal replicates the original master clock signal. If it still fails to replicate the original master clock signal, another iteration of time-calibration is again performed on the intermediate signals and the newly time-calibrated intermediate signals are used to generate yet another reference master clock signal. This continues until it is determined that the reconstructed reference master clock signal MCLK' no longer suffers from duty cycle error.

FIG. 9-2 illustrates the time-calibrated intermediate signals A', B' after it is determined that the reconstructed master clock signal MCLK' replicates the original master clock signal MLCK'. At this point, the duty cycle signal DC CLK will replicate the reference duty cycle signal Ref that represents zero mismatch between the rising edges of the reference master clock signal MCLK' and the original master clock signal MCLK as illustrated in FIG. 9-2. At this point, the receiver side component 800 of FIG. 8 will no longer perform iterations of time-calibration, and the reconstructed reference master clock signal MCLK' will be used at the receiver.

It should be appreciated that while the receiver-side component 800 of FIG. 8 has been described with reference to performing time-calibration and reconstruction using a single pair of lower-frequency sub-clocks, one ordinarily skilled in the art will recognize that the receiver-side component may be extended to perform time-calibration and reconstruction using more than one pair of lower-frequency sub-clocks. Additionally, while the reconstruction of a reference master-clock signal from one or more pairs of lower-frequency sub-clocks has been described with respect to lower-frequency sub-clocks suffering from duty-cycle mismatch, one ordinarily skilled in the art will recognize that the method and receiver side component for reconstructing a high-frequency master-clock signal may be extended to reconstruct a high-frequency sub-clock from lower-frequency sub-clocks that suffer from phase-shift mismatch.

Although particular embodiments have been shown and described, it will be understood that they are not intended to limit the claimed invention, and it will be made obvious to those skilled in the art that various changes and modifications may be made without departing from the scope of the claimed invention. The specification and drawings are, accordingly, to be regarded in an illustrative rather than restrictive sense. The claimed invention is intended to cover alternatives, modifications, and equivalents.

What is claimed is:

1. A method for high frequency clock distribution in a VLSI system, comprising:
    splitting an original master clock signal into one or more pairs of lower-frequency sub-clocks for a destination in the VLSI system, wherein the one or more pairs of lower-frequency sub-clocks have a lower frequency than a frequency of the original master clock signal;
    distributing each lower-frequency sub-clock of the one or more pairs of lower-frequency sub-clocks to a corresponding channel coupled to the destination; and
    reconstructing a reference master clock signal at the destination from the one or more pairs of lower-frequency sub-clocks,
    wherein the reconstructed reference master clock signal replicates the original master clock signal.

2. The method of claim 1, wherein the act of reconstructing the reference master clock signal comprises performing error correction.

3. The method of claim 1, wherein the act of splitting the original master clock signal is performed using a ring-shift register.

4. The method of claim 1, wherein the act of splitting the original master clock signal is performed using a frequency divider and a shift register.

5. The method of claim 1, wherein the act of splitting the original master clock signal into one or more pairs of lower-frequency sub-clocks is performed based at least in part upon a fundamental frequency of the original master clock signal.

6. The method of claim 1, wherein the act of splitting the original master clock signal into one or more pairs of lower-frequency sub-clocks is performed based at least in part upon attenuation characteristics of the channels coupled to the destination.

7. The method of claim 1, wherein the one or more pairs of lower-frequency sub-clocks are duty cycle mismatched.

8. The method of claim 1, wherein the one or more pairs of lower-frequency sub-clocks are phase mismatched.

9. The method of claim 1, wherein each lower-frequency sub-clock of the one or more pairs of lower-frequency sub-clocks represents a different phase.

10. A method for reconstructing a reference master clock signal that replicates an original master clock signal from a pair of lower-frequency sub-clocks that suffers from timing errors, the method comprising:
    generating a pair of intermediate signals from the pair of lower-frequency sub-clocks that suffer from timing errors;
    reconstructing a first reference master clock signal from the pair of lower-frequency sub-clocks that suffer from timing errors;
    determining whether the first reference master clock signal replicates the original master clock signal;
    performing time-calibration on the intermediate signals to generate time-calibrated intermediate signals when the first reference master clock signal fails to replicate the original master clock signal; and
    reconstructing a second reference master clock signal by combining the time-calibrated intermediate signals,
    wherein the second reference master clock signal replicates the original master clock signal.

11. The method of claim 10, wherein the time-calibration is performed iteratively.

12. The method of claim 10, wherein the pair of lower-frequency sub-clocks that suffers from timing errors is duty-cycle mismatched.

13. The method of claim 10, wherein the pair of lower-frequency sub-clocks that suffers from timing errors is phase-mismatched.

14. The method of claim 10, wherein the act of determining whether the first reference master clock signal replicates the original master clock signal comprises:
- creating a duty cycle signal using either rising edges or falling edges of the first reconstructed reference master clock signal; and
- comparing the duty cycle signal to a reference duty cycle.

15. An apparatus for performing high frequency clock distribution in a VLSI system, comprising:
- a ring-shift register configured to split an original master clock signal into a pair of lower-frequency sub-clocks;
- a pair of channels coupled to the ring-shift register, each channel of the pair of channels corresponding to a lower-frequency sub-clock of the pair of lower-frequency sub-clocks;
- a pair of AND gates, each AND gate of the pair of AND gates coupled to the pair of lower-frequency sub-clocks;
- wherein the pair of AND gates are configured to generate a pair of intermediate signals;
- a pair of delay components, each delay component of the pair of delay components coupled to a corresponding intermediate signal in the pair of intermediate signals;
- wherein the pair of delay components is configured to perform time-calibration on the pair of intermediate signals to generate a pair of time-calibrated intermediate signals; and
- an OR gate coupled to the pair of time-calibrated intermediate signals, the OR gate configured to reconstruct a reference master clock signal that replicates the original master clock signal.

16. The apparatus of claim 15, wherein the pair of delay components are configured to perform time-calibration on the pair of intermediate signals in an iterative manner.

17. The apparatus of claim 15, wherein the pair of lower-frequency sub-clocks is duty-cycle mismatched.

18. The apparatus of claim 15, wherein the pair of lower-frequency sub-clocks is phase mismatched.

19. The apparatus of claim 15, wherein the pair of delay components is configured to perform the time-calibration on the pair of intermediate signals by performing the time-calibration on one intermediate signal of the pair of intermediate signals.

20. The apparatus of claim 15, wherein the pair of delay components is configured to perform the time-calibration on the pair of intermediate signals by performing the time-calibration on both intermediate signals of the pair of intermediate signals.

* * * * *